United States Patent
Nago (10) Patent No.: US 9,088,987 B2
(45) Date of Patent: Jul. 21, 2015

(54) COMMUNICATION CHANNEL DETERMINATION METHOD AND A DETERMINATION APPARATUS

(75) Inventor: Hidetada Nago, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 1100 days.

(21) Appl. No.: 12/652,723

(22) Filed: Jan. 5, 2010

(65) Prior Publication Data

US 2010/0189057 A1    Jul. 29, 2010

(30) Foreign Application Priority Data

Jan. 26, 2009   (JP) ................................. 2009-014583

(51) Int. Cl.
*H04W 72/12*   (2009.01)
*H04W 72/04*   (2009.01)

(52) U.S. Cl.
CPC ................................. *H04W 72/0486* (2013.01)

(58) Field of Classification Search
USPC .......... 370/329, 330, 447; 455/443, 446, 447, 455/450, 452.1
See application file for complete search history.

(56) References Cited

U.S. PATENT DOCUMENTS

| | | | |
|---|---|---|---|
| 5,394,433 A | 2/1995 | Bantz et al. | |
| 6,032,045 A | 2/2000 | Mimura | |
| 6,078,609 A | 6/2000 | Nago | |
| 7,454,214 B2 * | 11/2008 | Cave et al. | 455/453 |
| 7,773,998 B2 * | 8/2010 | Ikegami | 455/452.2 |
| 2003/0087645 A1 * | 5/2003 | Kim et al. | 455/453 |
| 2006/0025150 A1 * | 2/2006 | Kim et al. | 455/453 |
| 2008/0096573 A1 * | 4/2008 | Chu | 455/450 |
| 2009/0213801 A1 * | 8/2009 | Bejerano et al. | 370/329 |

FOREIGN PATENT DOCUMENTS

| | | |
|---|---|---|
| JP | 7-15443 A | 1/1995 |
| JP | 10-66142 A | 3/1998 |
| JP | 10-285642 A | 10/1998 |
| JP | 2007-214805 A | 8/2007 |
| WO | 2007/028139 A2 | 3/2007 |
| WO | 2008/004561 A1 | 1/2008 |

OTHER PUBLICATIONS

U.S. Appl. No. 12/629,323, filed Dec. 2, 2009. Applicant: Hidetada Nago.
Japanese Office Action dated Feb. 18, 2013 issued in corresponding Japanese Patent Application No. 2009-014583.

* cited by examiner

*Primary Examiner* — Thai Nguyen
(74) *Attorney, Agent, or Firm* — Fitzpatrick, Cella, Harper & Scinto (57) ABSTRACT

By controlling a plurality of communication apparatuses, when determining the communication channel used by each apparatus, conducting determination of channel allocation priority order of communication apparatuses, based on the extracted load information of the communication apparatus. Based on the determined channel allocation priority order, setting the communication channels as they should be set, in case the other communication apparatus can not conduct communication in the channels the aforementioned channel is set, the channel is allocated as the channel used by the communication apparatus.

21 Claims, 12 Drawing Sheets

COMMUNICATION CHANNEL DETERMINATION METHOD AND A DETERMINATION APPARATUS

BACKGROUND OF THE INVENTION

1. Field of the Invention

The present invention relates to, in a case where a plurality of base stations exist, a technology that enable conducting auto configuration of channels so that communication channels used by each base station is not overlapped each other.

2. Description of the Related Art

Determining the channel of a base station based on the interference level of the neighboring base stations is a mainstream channel determination method in cellular phone systems. However, in IEEE 802.11 systems, such a channel determination method as in cellular phone systems is not defined; here, each base station conducts the channel determination individually by itself.

In Japanese Patent Laid-Open No. 10-285642, in a base station with a plurality of channels, calculating neighboring base station channel interference level of the each channel which is not been used, and when a terminal request for new channel allocation is received, assigning from the channel which has the lowest calculated interference level, is being disclosed.

Additionally, In Japanese Patent Laid-Open No. 10-66142, a base station receiving the signals from the neighboring base stations, and if the signal receiving level is below a threshold value allocating the same channel, in case the value is over a threshold then selecting another channel is being disclosed.

Further, In Japanese Patent Laid-Open No. 7-15443, providing a frequency hopping pattern controlling unit, such that, checking whether interference is occurred when a hopping pattern is used, in case interference is occurred changing to a new hopping pattern, is being disclosed.

In the prior art as given above, mostly, the determination of whether interference occurred or not with the neighboring station, and the degree of the interference, are being used for channel allocation in the conventional art.

However, the above wireless LAN systems compliance with the IEEE802.11 standard conducts channel allocation individually. Therefore, when the neighboring base station is using identical channels and also the traffic is high, the traffic level of the base station is peaked out at a lower traffic level compared to the traffic level that can be individually attained by the base station itself and the neighboring base station.

To overcome this problem, making the channels not to overlap with each other is required; and it was conducted by manually allocating the channels.

Further, in base station that automatically allocates channels that is not being used, the channel allocating started by the base station that started first and the base stations conduct channel allocation one after the other based on the starting time. In this method, to decide whether channel is being used or not, the actual channel communication status is not considered. Therefore, the channels with low communication traffics may be allocated to dedicated channels and channels with high communication traffics may be allocated into shared channels, easily making the way for generating more interference among a plurality of base stations.

SUMMARY OF THE INVENTION

In the present invention, a communication channel allocation method and an apparatus, which is able to consider the communication traffic of a plurality of communication apparatus, is been proposed.

One aspect of the present invention is provided by a method of a determination apparatus for determining communication channels used by a plurality of communication apparatuses, comprising: determining the order of priority of the plurality of communication apparatuses that communication channels are set, based on load information of the plurality of communication apparatuses; and allocating the communication channels to the plurality of communication apparatuses according to the determined order of priority.

Another aspect of the present invention is provided by a determination apparatus for determining communication channels used by a plurality of communication apparatuses, comprising: a determination unit that determines the order of priority of the plurality of communication apparatuses that communication channels are set, based on load information of the plurality of communication apparatuses; and an allocation unit that allocates the communication channels to the plurality of communication apparatuses according to the order of priority determined by the determination unit.

Further features of the present invention will become apparent from the following description of exemplary embodiments (with reference to the attached drawings).

DESCRIPTION OF THE EMBODIMENTS

Hereinafter, the preferred embodiments of the present invention will be described in detail below with reference to the accompanying drawings.

First Embodiment

Figure 1:
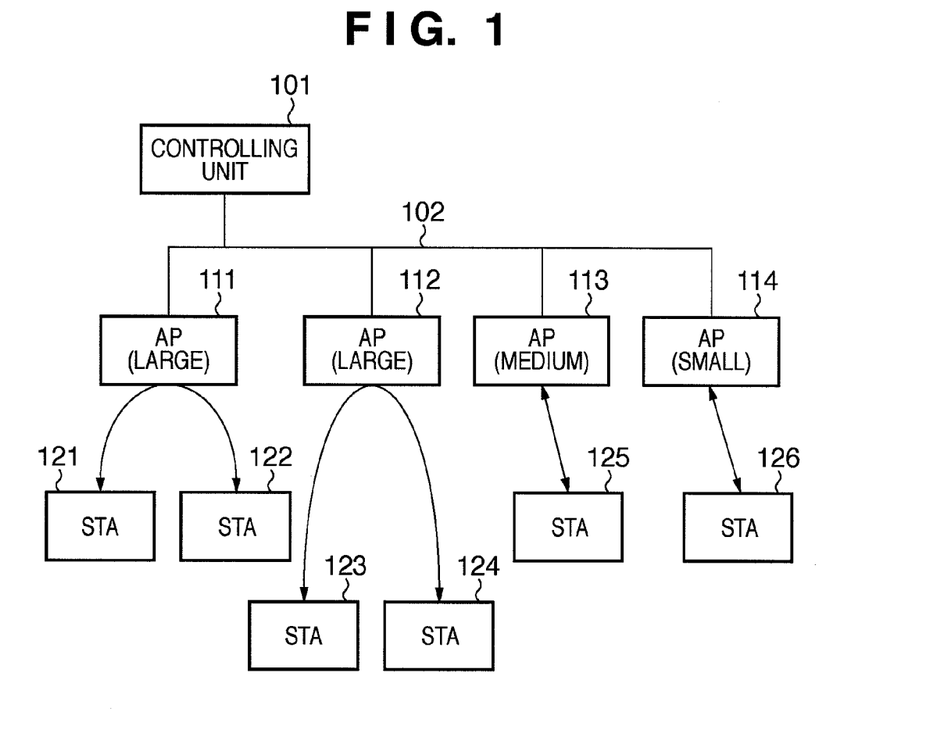
FIG. 1 is a figure showing an exemplary system construction according the first embodiment of the present invention.

FIG. 1 is a figure showing an exemplary system construction according the first embodiment of the present invention. Here, as the communication system, a wireless LAN system compliance with IEEE801.11 standard is given as an example. A base station of the wireless LAN system purports a communication unit, and a terminal of the wireless LAN system purports a terminal station.

As represented in FIG. 1, a controlling unit 101 and a plurality of base stations (AP) 111-114 are connected to each other through a LAN 102. Further, terminals (STA) 121 and 122 are connected to wireless LAN of a base station 111; and terminals 123 and 124 are connected to wireless LAN of a base station 112. Furthermore, a terminal 125 is connected to the wireless LAN of a base station 113; and a terminal 126 is connected to the wireless LAN of a base station 114.

Here, the hardware and software construction of the base stations 111-114, and the terminals 121-126, may be of the conventional art, therefore, the explanation here is abbreviated.

Moreover, in the example shown in FIG. 1, communication system having the four base stations 111-114, and the six terminals 121-126, is explained; however this invention does not limited to it.

Furthermore, the notation "(large) (medium) (small)" of the base station 111-114 refer to communication load. Here, the communication load is determined considering the traffic, number of connected terminals, and communication type (Infrastructure mode, ad hoc mode). As an example the communication loads can be obtained based on all of the information, which are traffic, the number of connected terminals, and communication type (Infrastructure mode, ad hoc mode) or one of the information. Moreover, various information such as QoS category, communication type and communication content such as video streaming, can be used for determining the load. This information is installed by the administrator. As an example, an exhibitor or an administrator of a conference hall may understand the communication traffic, connected terminals, communication type and communication contents of each booth. In such a case, since the administer has a prior knowledge of the communication status, the administrator may configure the communication load of each device accordingly. On the other hand, after activation of the base station, load information may obtain after every predetermined time interval, and reallocation of the channel may conduct based on the received load data, after each predetermined time interval. As shown in FIG. 1, the base stations 111 and 112 have "large" load; the base station 113 has a "medium" load; and the base station 114 has a "small" load.

Figure 2:
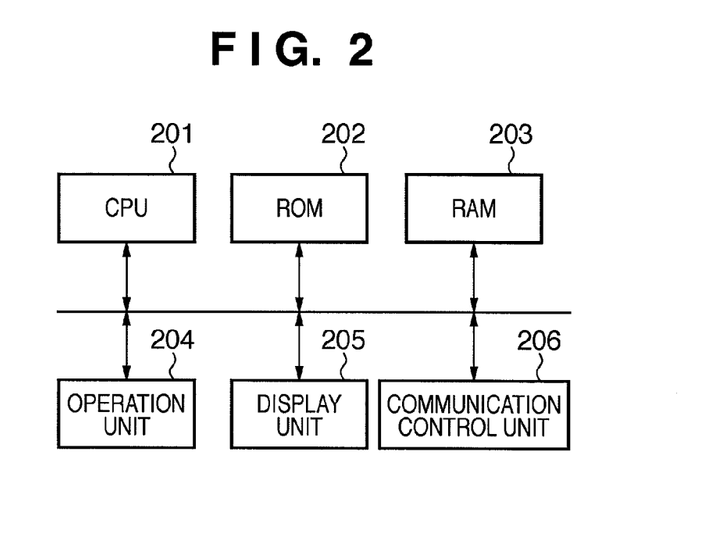
FIG. 2 is a figure showing an exemplary construction of the controlling unit according the first embodiment of the present invention.

FIG. 2 is a figure showing an exemplary construction of the controlling unit according the first embodiment of the present invention. As represented in FIG. 2, a controlling unit 101 comprises a CPU 201, a ROM 202, a RAM 203, an operation unit 204, a display unit 205, and a communication control unit 206. Here, the CPU 201, according to the program and control data stored in the ROM 202, via the communication control unit 206, receives load data that indicates communication load from the base stations 111-114. Then, based on the obtained load information functions as communication channel determination unit that automatically allocates the communication channels of the base stations 111-114.

Furthermore, load information extraction may be conducted by control unit 101 automatically, or an operator may operate the operation unit 204 and display unit 205 to obtain load information manually.

The channel determination method executed by the controlling unit 101 of the wireless LAN system will be described using the FIG. 3 to FIG. 5B. First, according to the FIG. 3, the First Determination Process which is conducted by the controlling unit 101 to determine the order of priority of the base stations 111-114 for allocating the channels, based on the obtained load data received from the base stations 111-114, will be explained.

Figure 3:
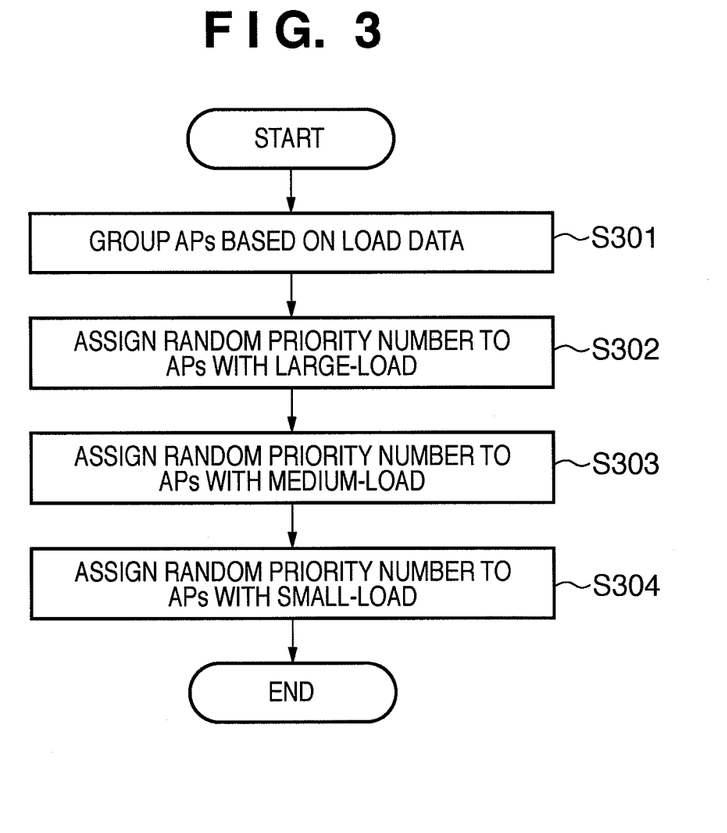
FIG. 3 is a flowchart showing the determination process of priority order of base stations according the first embodiment of the present invention.

FIG. 3 is a flowchart showing the determination process of priority order of base stations according the first embodiment of the present invention. First, base stations 111-114 is grouped into three groups based on the load information (S301). Specifically, channel allocation priority order is assigned to the large-load group (S302). Here, when there are base stations within this group, channel allocation order of priority is assigned randomly. In this example, the base station 111 and the base station 112 is been selected, and the priority number one is assigned to base station 111 and the priority number two is assigned to the base station 112.

Next, channel allocation order of priority is assigned to the medium-load group (S303). Here, when there are base stations within this group, channel allocation priority order is assigned randomly; in this example, there is only one base station in this group (base station 113); therefore, the base station 113 is assigned to priority number three.

Finally, similar to the above cases, small-load group is also receives channel allocation priority numbers (S304). When there are multiple base stations, the priority numbers are assigned randomly, since in this example there is only one base station (base station 114), the base station 114 is allocated to the priority number of four.

Next, according to the FIG. 4, the Second Determination Process which is conducted by the controlling unit 101 to determine the order of channel allocation priority of the base stations 111-114, will be explained. Here the channel 1, channel 2, channel 3 and channel 4 are used as communication channels, and it is assumed there is no interference between these channels.

Figure 4:
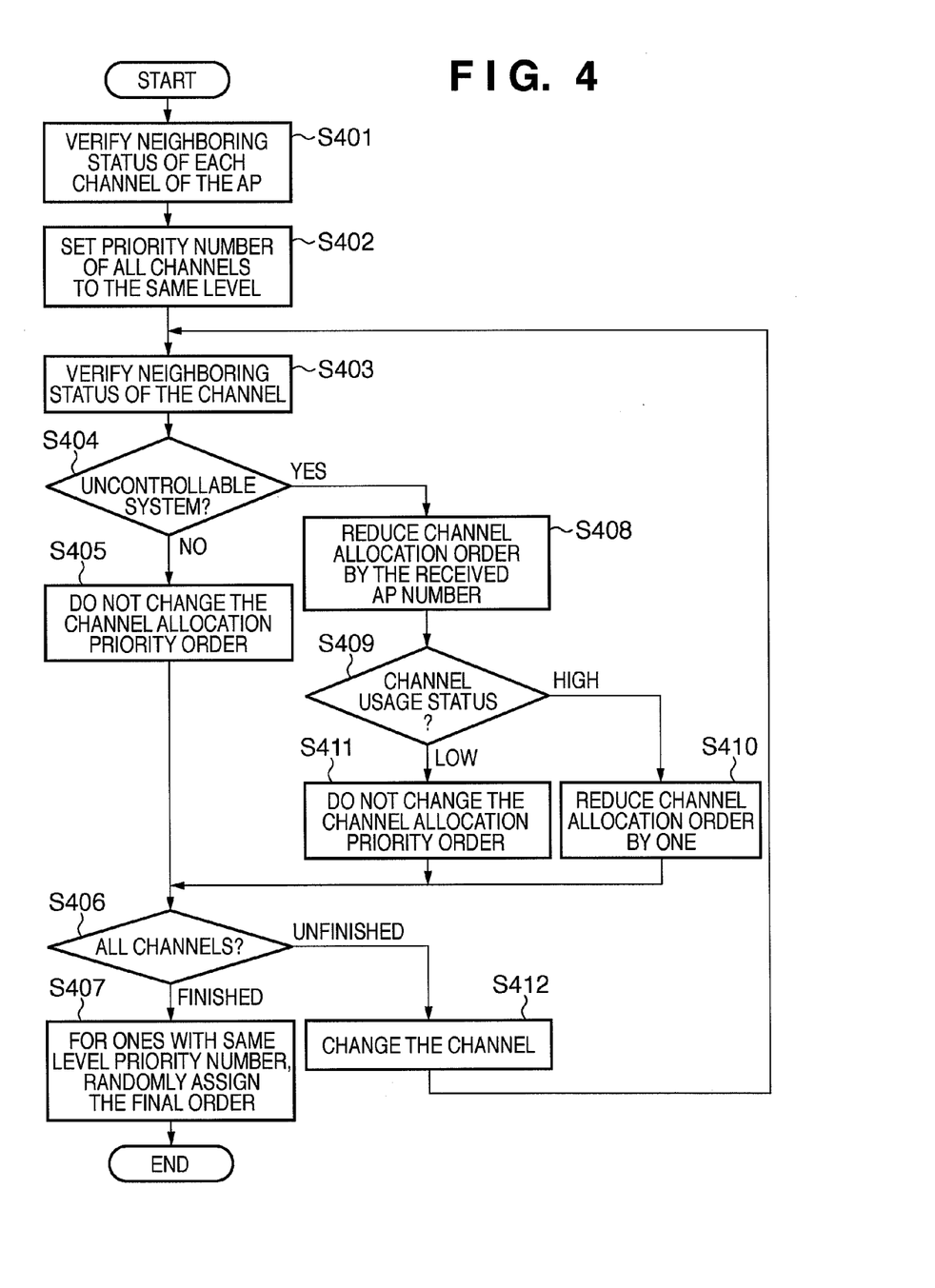
FIG. 4 is a flowchart showing the determination process of priority order of channels according the first embodiment of the present invention.

FIG. 4 is a flowchart showing the determination process of order of priority of channels according the first embodiment of the present invention. The neighboring status of channels to be used in any base station or all the base stations is obtained (S401). In this example, in the initial stage, the order of priority of the four channels which is used, is set to the same level (S402). Then, the controlled base stations 111-114 search whether uncontrolled devices exist or not; in case there are uncontrolled devices, the dedicated signal status is checked and reported (S403). Next, channels are being checked to find whether uncontrolled devices emit signals in any channels with allocated order of priority (S404). In case the uncontrolled devices do not emit signals within any channels with allocated order of priority, the allocated order of priority of channels is unchanged (S405).

On the other hand if the uncontrolled devices are emitting wirelessly signals, detects how many base stations received the signal, among the base stations 111-114 under the control of controlling unit 101, and reduce the channel allocation order by the received AP number (S408). Then, the dedicated time period of the uncontrolled devices is checked (S409). Here, in case the dedicated time is short, the channel allocation order of priority is not changed (S411). On the other hand, the dedicated time interval is large, the order of priority is reduced by one (S410).

The above process is repeated for all the channels (S406) while changing the channel (S412). Then channel allocation order of priority is determined by randomly assigning channels to channels with same order of priority (S407). In this example, due to above process the obtained order is considered to be channel 1, channel 2, channel 3, and channel 4.

Next, the controlling unit 101 configures the priority order of all base stations and priority order of channel allocation; then, allocation of channel priority order in each base station is described.

Figure 5A:
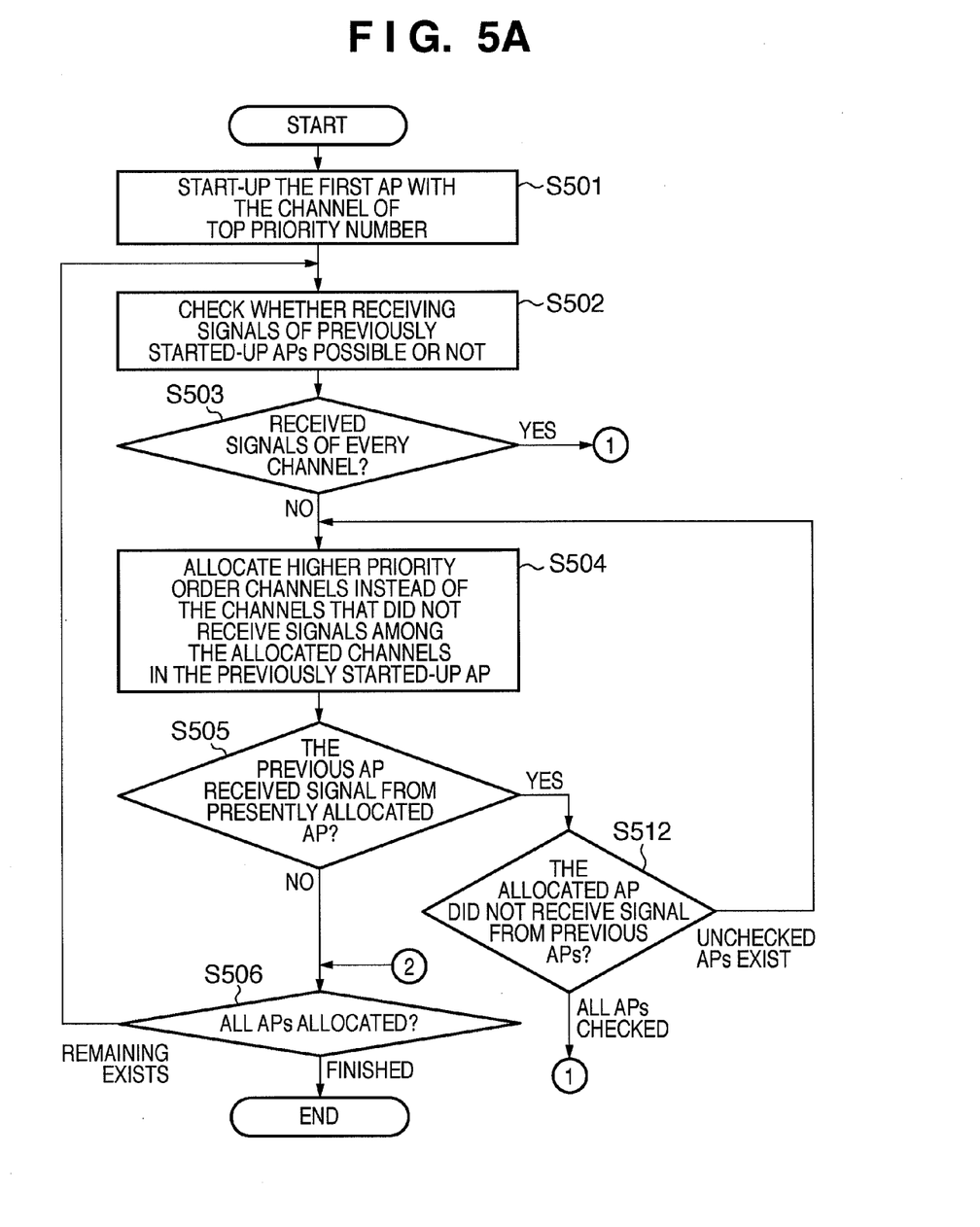
FIGS. 5A and 5B are flowcharts showing channel allocation process according the first embodiment of the present invention.
Figure 5B:
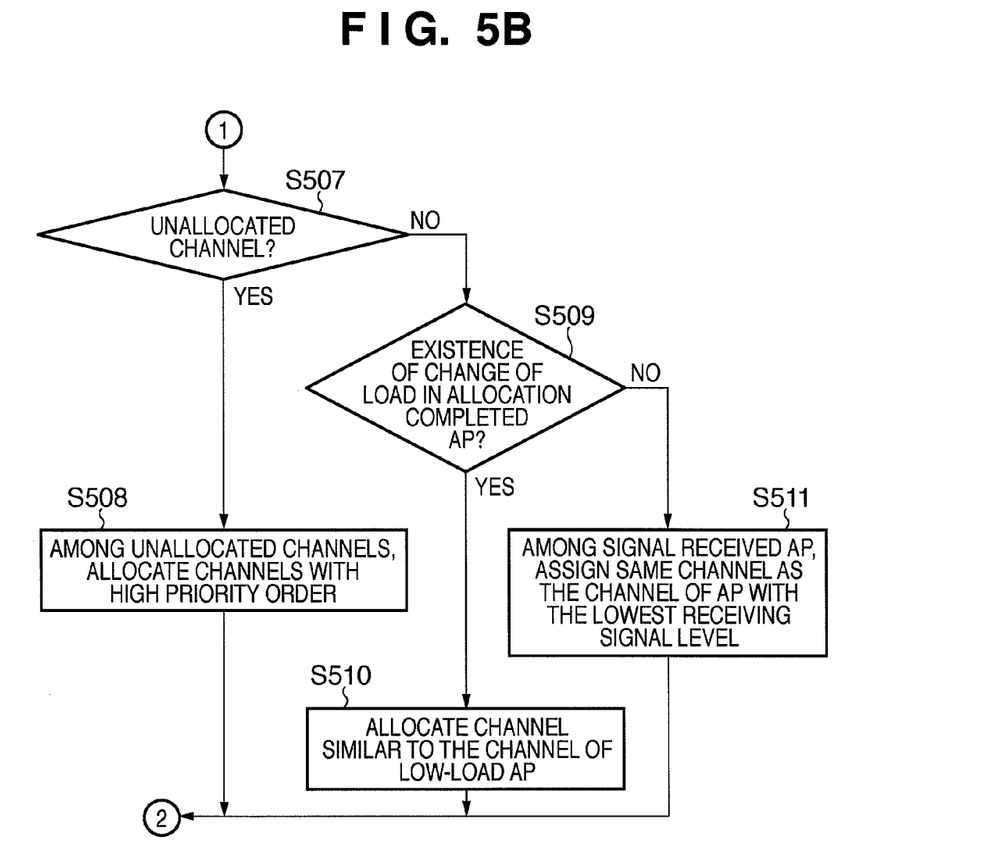

FIGS. 5A and 5B are flowcharts showing channel allocation process according the first embodiment of the present invention. First, the first start-up base station 111 is started with the channel that has the first priority order (first channel)

(S501). Next, the fact that the first start-up base station 111 is started in first channel is notified to the second start-up base station 112, and it is checked whether the second start-up base station receives the wireless signals from the base station 111 or not (S502). Here, in case the base station 112 could receive the wireless signal from the base station 111 (S503, Yes), it is checked whether there is unused channels (S507). Here, in case there are channels which are not allocated, the base station 112 is instructed to start with channel two (S508) that is among the channels which is not being used, the channel with second channel allocation priority order.

On the other hand in S503, in case the base station 112 does not receive the wireless signals from the base station 111, the base station is instructed to start with the channel 1 (S504), and verifies whether base station 111 receives wireless signal from the base station 112 (S505). In case base station 111 is not receiving signals from the base station 112, the channels are not changed, and check whether allocating all the channels have been finished or not (S506); in case there are remaining channels, returns to the step S502 and the above process is repeated.

Moreover, in S505, when the base station 111 can receive the signal form the base station 112, whether there are any remaining previous base stations that did not received the signal is checked (S512). In case there are remaining base stations, returns to S504. In case there are no remaining base stations, check whether there are unallocated channels or not (S507), in case there are channels, the channel which is not allocated to base station 112 is changed to channel with second channel allocation order of priority (S508).

In the following similarly, in case previously started up channel signal is not received, the base station is assigned to the same channel. In case the channel of previously started base station is received, the channel with the next priority order is assigned. Finally, when there are no channels to be assigned, determine whether the base stations with channel assignments had any load changes or not (S509). According to the determination, in case there are load changes, allocate a channel similar to the lower load base station (S510); in case no load changes are occurred, among the base stations that are able to receive the signal, allocate channel similar to the base station with lower receiving level (S511).

Next, in case the four base stations 111-114 are located as in FIG. 6, specific communication channel allocation considering the communication area overlaps will be explained.

Figure 6:
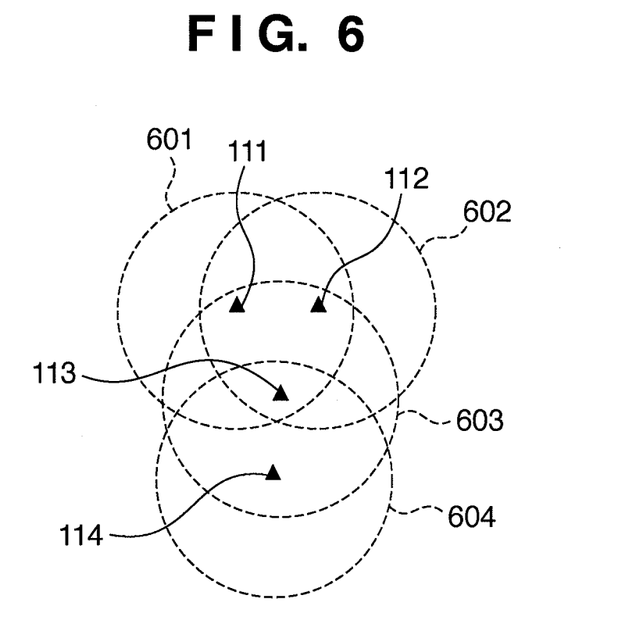
FIG. 6 is a figure showing an exemplary wireless coverage of each base station according to the first embodiment of the present invention.

FIG. 6 is a figure showing an exemplary wireless coverage of each base station according to the first embodiment of the present invention. Numeral 601 represents coverage area of the base station 111; numeral 602 represents coverage area of the base station 112; numeral 603 represents coverage area of the base station 113; and numeral 604 represents coverage area of the base station 114.

First, when setting all the starting order of priority, and setting channel allocating priority order is completed, the first start-up base station 111 is started with the channel that has the first priority order (first channel) (S501). Next, the fact that first start-up base station is started in first channel is notified to the second start-up base station 112, and it is checked whether the second start-up base station receives the signals from base station 111 or not (S502). According to the example in FIG. 6, Here, the base station 112 could receive a wireless signal from base station 111 (S503: YES). Here the controlling unit 101 check whether there are unallocated channel to the base station (S507), and instruct the base station 112 to stat with channel 2 which is the channel with second order of priority (S508). Since the channels allocated to base station 111 and base station 112 is different, checking whether base station 111 can receive signal from base station 112 is not conducted.

Next, the operational channels of the base station 111 and the base station 112 are notified to the third startup priority base station 113, and verify whether wireless signals from the base station 111 and the base station 112 are being received or not (S502).

In the example of FIG. 6, since the base station 113 can receive the wireless signals from the base station 111 and the base station 112, the both base stations 111 and 112 receive a report stating the fact that it has received signal (S503: YES). Here, controlling unit 101 checks for channels that is not allocated for the base station (S507), the channel with third allocation order of priority is allocated (S508), and is instructed starting the base station 113 with channel three.

Since the channels allocated to the base station 111, the base station 112, and the base station 113 are different, the base station 111 and the base station 112 do not check whether these receive signal from the base station 113.

Finally, the operational channels of the base station 111, the base station 112 and the base station 113 are notified to the fourth startup priority base station 114, and verify whether signals from the base station 111, the base station 112 and the base station 113 are being received or not (S502).

In the example of FIG. 6, it is notified that the base station 114 can receive signals from the base station 113 and the base station 114 cannot receive signal from the base station 111 and base station 112, (S503: NO). Therefore, the base station 114 is allocated to a channel one which is the same as the channel of base station 111, and is instructed starting the base station 114 with channel one (S504).

Next, it is checked whether the base station 111 receives wireless signal from the base station 114 (S505). Here, in case signal is not received, the base station 114 conducts communication using channel one. In case the wireless signal of the base station 114 is received by the base station 111, it is checked whether there are previous base stations that does not receive signal from the base station 114 (S512); then, the channel of base station is allocated to channel 2 which is the same channel as the base station 112 (S504).

Then, whether the base station 112 receives signal from the base station 114 (S505) is checked; in case signal is not received, the base station 114 conducts communication using channel two. In case the signal of base station 114 is received by the base station 112, whether there are previous base stations that does not receive signal from the base station 114 is checked (S512). Here, since all the channels previously assigned are checked, the channels that has not allocated to the base station 114 is checked (S507), and set channel four with the fourth channel allocation order of priority (S508) to the base station 114.

When there are many base stations and there are not enough assignable channels, it is checked for the not allocated channels (S507), when there are no channels that is not allocated, it is checked whether any of the already channel assigned base stations have their load changed (S509). Here, if there is a change in load, the base station is assigned with the same channel as the base station with lower load according to the load information (S510). In case there is not load change, among the previously started base stations, channel of the base station with lowest receiving level is allocated to the base station (S511).

After this, when all channel allocation is completed, the usual communication is started.

As above, the channel allocation is conducted considering the loads of the base stations; therefore, effective usage of the communication channels is possible. Further, for base stations with bigger loads communication channels with less interference is being allocated, making it possible to conduct efficient communications. Moreover, in case the base stations assigned to the same channel, the channel is assigned after checking the mutual communication status, therefore, the interference is low.

Second Embodiment

Next while referring to the figures, a second embodiment of the present invention will be explained. In situation such as exhibition halls, the schedule of exhibition is preset, therefore, in some cases all the base stations do not start at the same timing. In the second embodiment, channel allocation using each base station's operation schedule, in cases such as above, is being disclosed. In the second embodiment, the communication system and communication unit construction used is similar to that in first embodiment as given in FIG. 1 and FIG. 2, therefore, the explanation is abbreviated.

Figure 7A:
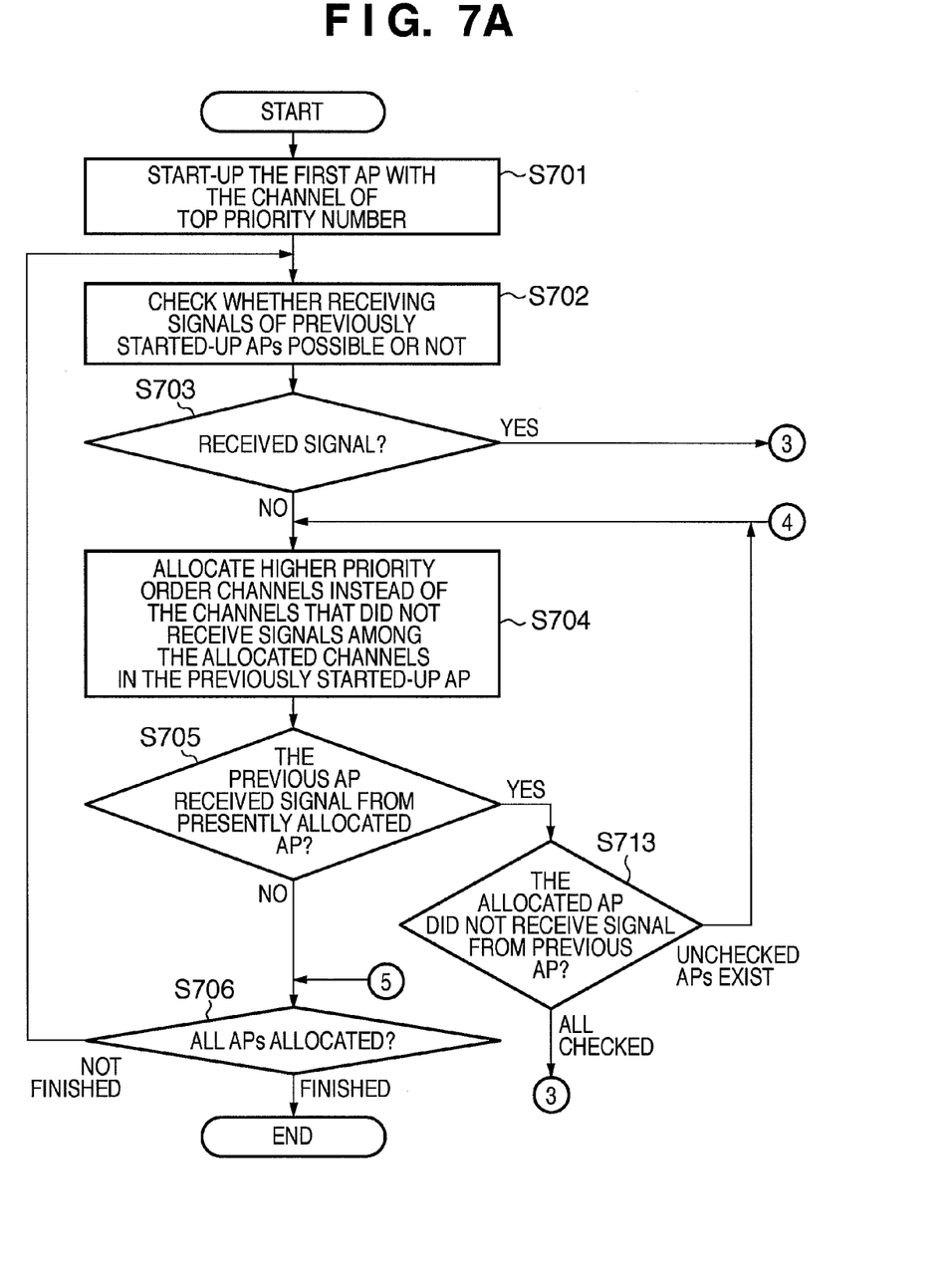
FIGS. 7A and 7B are flowcharts showing channel allocation process according the second embodiment of the present invention.
Figure 7B:
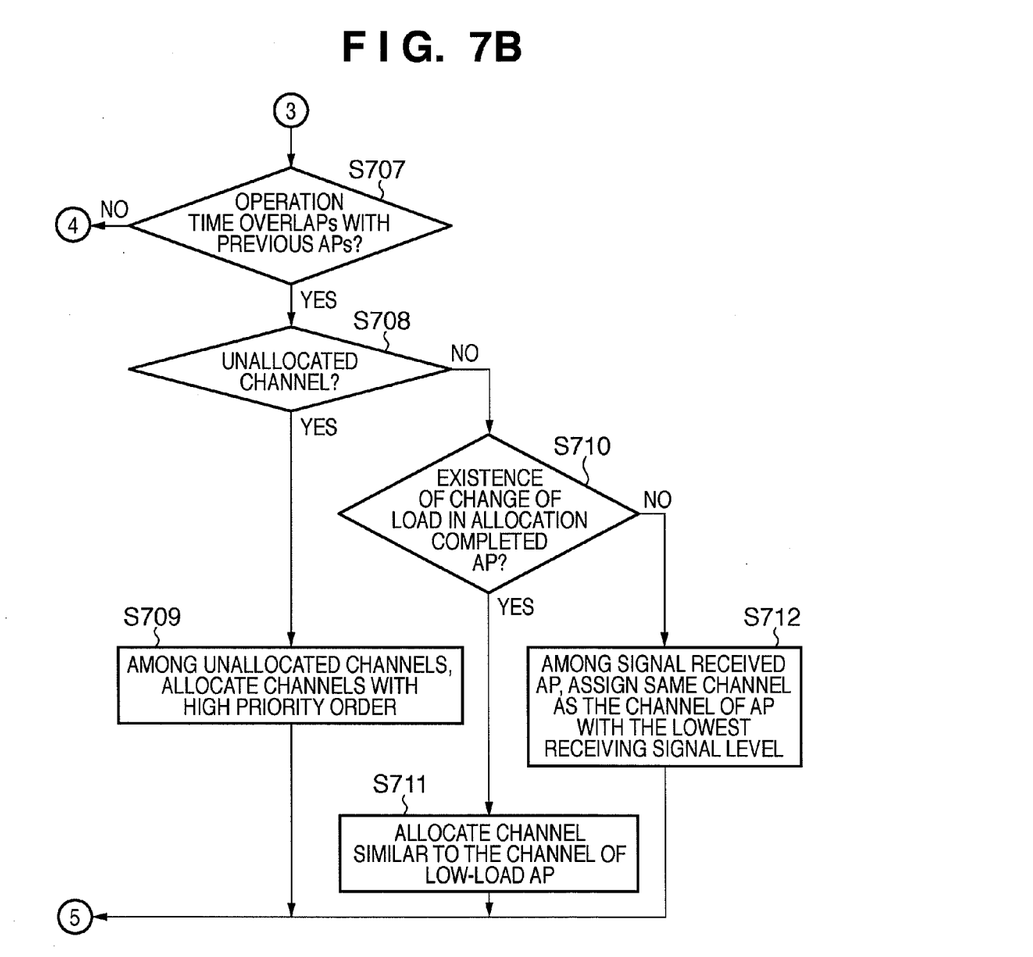

FIGS. 7A and 7B are flowcharts showing channel allocation process according the second embodiment of the present invention. Up to the step of checking whether wireless signals from previously started base stations are received or not (S703), the process flow is the same as the first embodiment. Here, when the signal is received, the operation schedule of aforementioned base station and the operation schedule of base station undergoing configuration is compared (S707). According to the comparison, if the operation schedules do not overlap with each other, the base stations are assigned to the same channel (S704).

On the other hand when it is overlapped, the controlling unit 101 checks for the channels that is not allocated to the base station (S708), instructs starting up at the next channel allocation, in the channel with the priority order (S709).

In the second embodiment, since channels of the previously started base stations and channel of the current base station is different, therefore, whether previously started base stations can receive the signal or not, is not determined.

Moreover, after comparing the operation schedules at the step S707, the process is conducted similar to the first embodiment as given in FIGS. 5A and 5B.

According to the second embodiment of the present invention, since channel allocation is conducted based on the operational time intervals of the base stations, a relatively efficient channel allocation process is conducted, which uses time as a measurement.

Third Embodiment

Next, while referring to the figures, a third embodiment of the present invention will be explained. In the third embodiment, all the base stations transmit wireless signals on same communication channel and detect the signal from other base stations, and then conduct similar channel allocation process.

In the third embodiment, the communication system and communication unit construction used is similar to that in first embodiment as given in FIG. 1 and FIG. 2, therefore, the explanation is abbreviated.

Figure 8A:
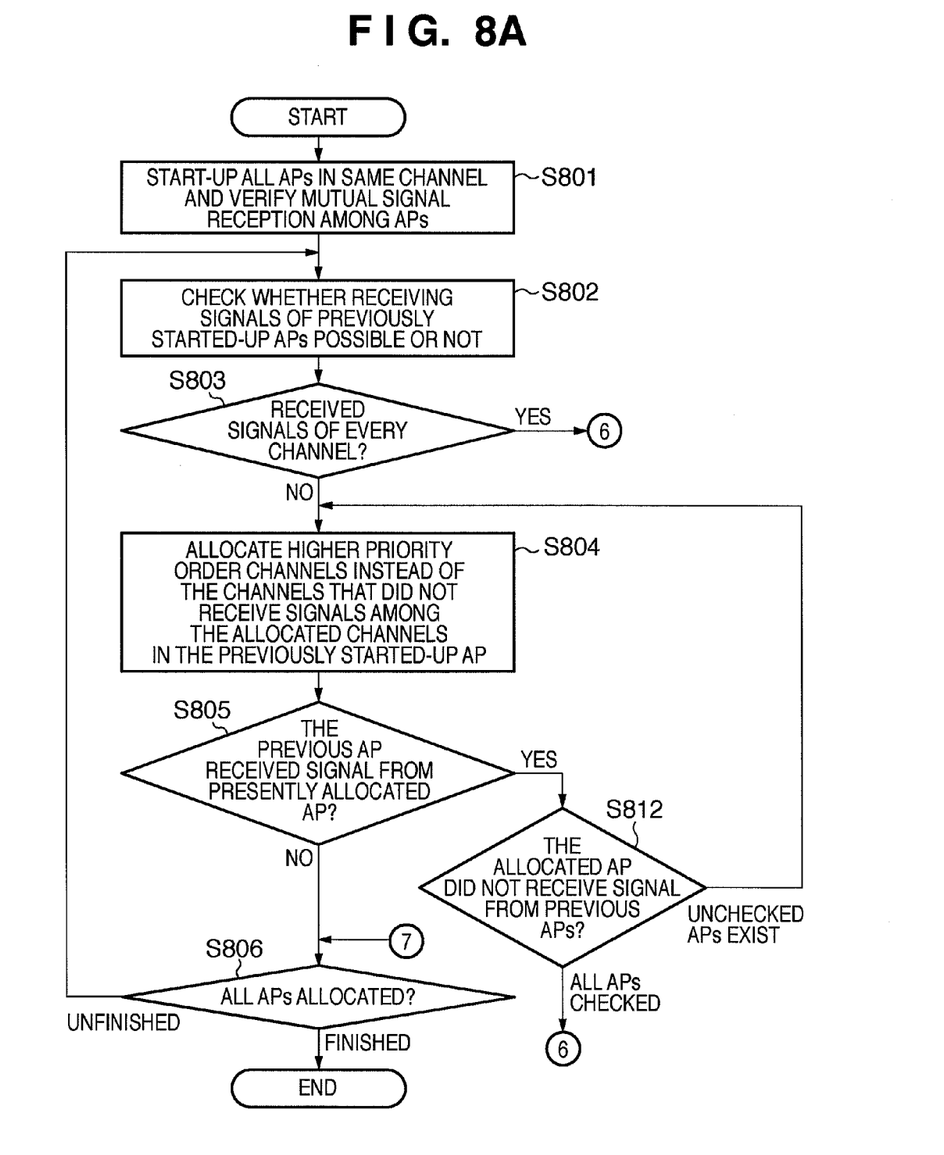
FIGS. 8A and 8B are flowcharts showing channel allocation process according the third embodiment of the present invention.
Figure 8B:
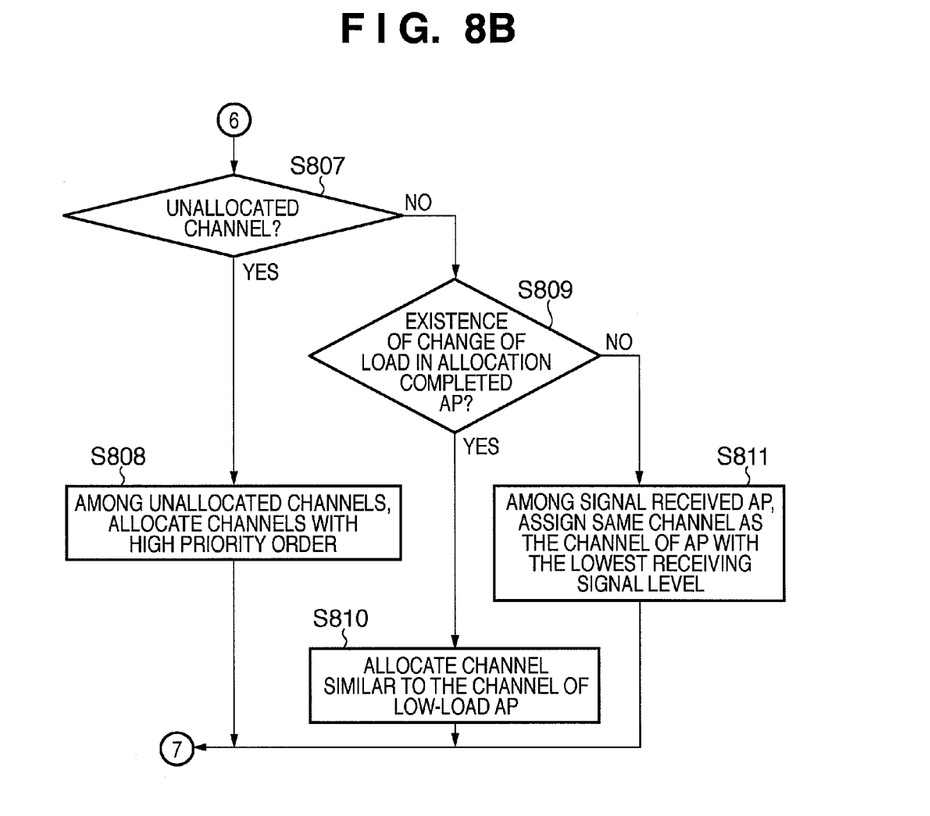

FIGS. 8A and 8B are flowcharts showing channel allocation process according the third embodiment of the present invention. The controlling unit 101 makes all the base stations under its control to send wireless signals in the same channel, and then each base stations records the signal receiving status from other base stations (S801). Based on this record, similar to the first embodiment, the controlling unit 101 determines channels for each base station.

When the same channel is allocated to base stations, process of receiving signals from the previously channel assigned base stations is not conducted, the process is based on the recoded results of the initially received signals, which is the main difference to the first embodiment.

According to the third embodiment, since the channel allocation is conducted based on the initial signal reception data, in case there are a large number of base stations the channel allocation time could be reduced. Moreover, checking the status by signaling on the same channel at the same time by all the base stations, the base stations are able to evaluate interference between each other and are able to evaluate the wireless-position on the wireless environment.

Fourth Embodiment

Next, while referring to the figures, a fourth embodiment of the present invention will be explained. The fourth embodiment applies the third embodiment into the second embodiment. In other words, all the base stations transmit wireless signals on same channel and detect the signal from other base stations, and then while including the operation schedule of each base station, conducts similar channel allocation process.

Figure 9A:
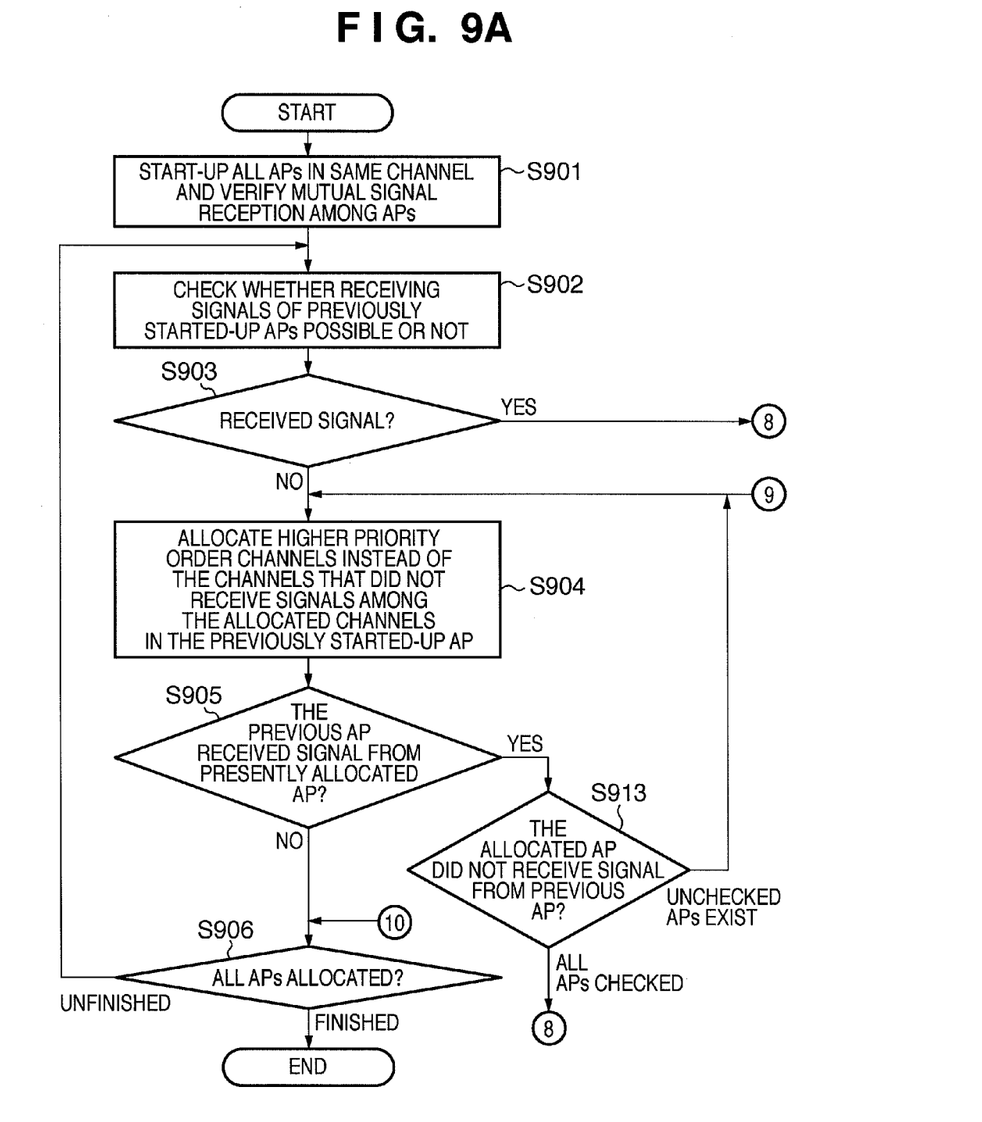
FIGS. 9A and 9B are flowcharts showing channel allocation process according the fourth embodiment of the present invention.
Figure 9B:
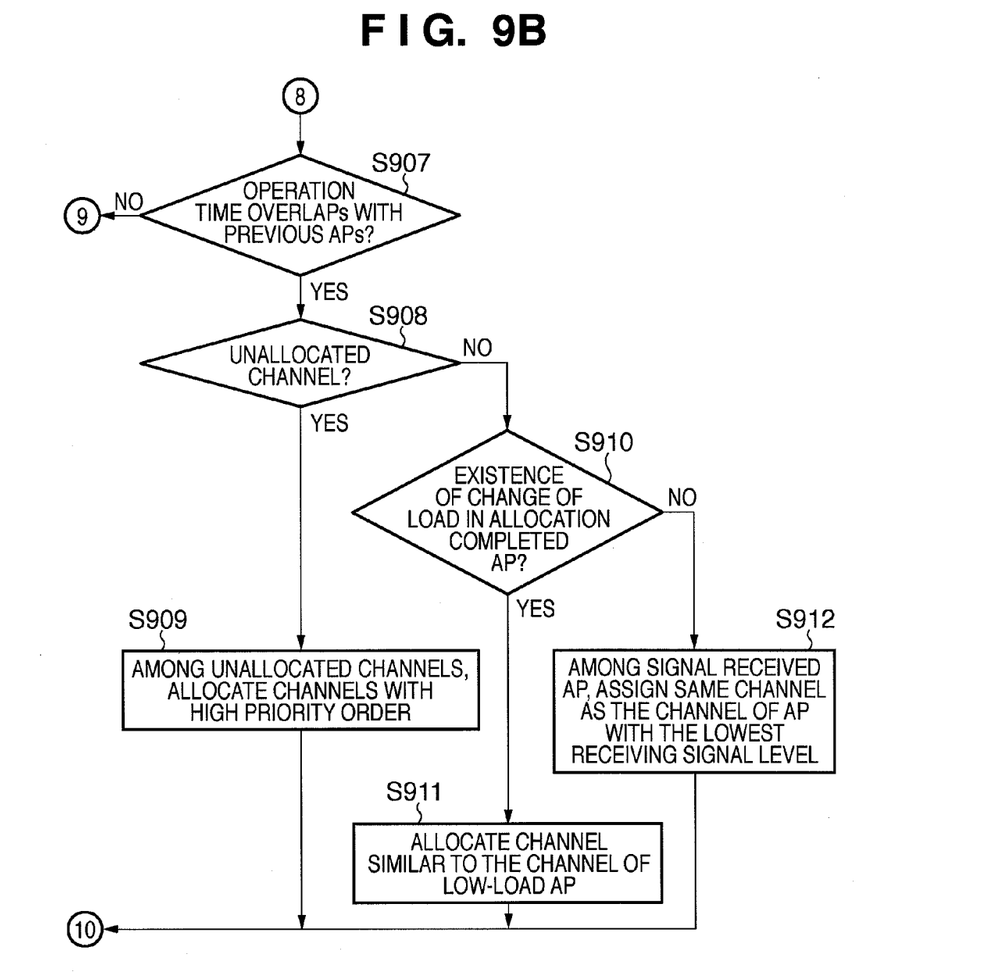

FIGS. 9A and 9B are flowcharts showing channel allocation process according the fourth embodiment of the present invention. The controlling unit 101 makes all the base stations under its control to send wireless signals in the same channel at the same time, and then each base stations records the signal receiving status from other base stations (S901). Based on this recorded received signals, similarly to the second embodiment, channel for each base station is determined.

When the same channel is allocated to base stations, process of receiving signals from the previously channel assigned base stations is not conducted, the process is based on the recoded results of the initially received signals, which is the main difference to the second embodiment.

Next, up to the step of checking whether signals from previously started base stations are received or not (S903), the process flow is the same to the second embodiment. Here, when the signal is received, the operation schedule of aforementioned base station and the operation schedule of base station undergoing configuration is compared (S907). According to the comparison, if the operation schedules do not overlap with each other, the base stations are assigned to the same channel (S904).

On the other hand when it is overlapped, the controlling unit 101 checks for the channels that is not allocated to the base station (S908), instructs starting up at the next channel allocation, in the channel with the priority order (S909).

In the fourth embodiment, since channels of the previously started base stations and channel of the current base station is different, therefore, whether previously started base stations can receive the signal or not, is not determined.

According to the fourth embodiment, by using time as a unit, channel allocation can be conducted in short time period.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-014583, filed Jan. 26, 2009, which is hereby incorporated by reference herein in its entirety.

What is claimed is:

1. A method of a controlling apparatus, comprising:
selecting a first communication apparatus, which has a higher load than a second communication apparatus, based on a load of a plurality of communication apparatuses;
determining interference on a plurality of communication channels caused by a signal sent from an uncontrolled apparatus which is not controlled by the controlling apparatus;
selecting a first communication channel from among the plurality of communication channels, whose interference is lower than that of a second communication channel, based on the determined interference on the plurality of communication channels; and
allocating the first communication channel to the first communication apparatus,
wherein, in allocating, the same communication channel as the first communication channel is allocated to a third communication apparatus in a case where the third communication apparatus is classified in the same load class as the first communication apparatus, and the first communication apparatus does not receive a signal from the third communication apparatus wirelessly and the third communication apparatus does not receive a signal from the first communication apparatus wirelessly, or another communication channel is allocated to the third communication apparatus in a case where either the first communication apparatus receives a signal from the third communication apparatus wirelessly or the third communication apparatus receives a signal from the first communication apparatus wirelessly.

2. The method according to claim 1, wherein in the allocating step, the same communication channel as the first communication channel is allocated to a third communication apparatus in a case where the third communication apparatus is classified in the same load class as the first communication apparatus, and the first communication apparatus and the third communication apparatus do not receive a signal, or another communication channel is allocated to the third communication apparatus based on a reception level of a signal of another communication apparatus in a case where either the first communication apparatus or the third communication apparatus receives the signal.

3. The method according to claim 1, wherein in the allocating step, the same communication channel is allocated based on an operation schedule of other communication apparatuses.

4. The method according to claim 1, wherein the load is determined based on at least one of communication traffic within a unit time, a number of connected terminals, a communication type, communication contents, and QoS category.

5. The method according to claim 1, wherein the load is updated every predetermined time interval, and channel allocation is periodically performed.

6. The method according to claim 1, further comprising setting an order of priority of communication channels based on the interference caused by the signal sent from the uncontrolled apparatus.

7. The method according to claim 6, wherein the order of priority of communication channels is decreased with an increasing of the interference.

8. A control apparatus, comprising:
a memory;
a processor;
a first selection unit that selects a first communication apparatus, which has a higher load than a second communication apparatus, based on a load of a plurality of communication apparatuses;
a determination unit that determines interference on a plurality of communication channels caused by a signal sent from an uncontrolled apparatus which is not controlled by the controlling apparatus;
a second selection unit that selects a first communication channel from among the plurality of communication channels, whose interference is lower than that of a second communication channel, based on the determined interference on the plurality of communication channels; and
an allocation unit that allocates the first communication channel to the first communication apparatus,
wherein, when the allocation unit allocates, the same communication channel as the first communication channel is allocated to a third communication apparatus in a case where the third communication apparatus is classified in the same load class as the first communication apparatus, and the first communication apparatus does not receive a signal from the third communication apparatus wirelessly and the third communication apparatus does not receive a signal, from the first communication apparatus wirelessly, or another communication channel is allocated to the third communication apparatus in a case where either the first communication apparatus receives a signal from the third communication apparatus wirelessly or the third communication apparatus receives a signal from the first communication apparatus wirelessly,
wherein the first selection unit, the determination unit, the second selection unit, and the allocation unit are realized by the processor reading out and executing a program recorded in the memory.

9. A non-transitory computer-readable storage medium on which is stored a program for causing a computer to execute the method according to claim 1.

10. A method of a controlling apparatus comprising:
establishing a predetermined communication channel for a plurality of base stations;
verifying whether each base station of the plurality of the base stations receives a wireless signal from another base station of the plurality of the base stations via the predetermined communication channel;
determining a load for each of the plurality of base stations;
ordering the plurality of base stations based on determined load; and
allocating communication channels to the plurality of base stations in order of base station load from highest to lowest, based on the order,
wherein, in allocating, a first communication channel is allocated to the highest load base station, a second communication channel is allocated to the second highest load base station if the second highest load base station is located in a position in which it can receive a wireless signal sent from the highest load base station, and the first communication channel is allocated to the third highest load base station if the third highest load base station is located in a position in which it cannot receive a wireless signal sent from the highest load base station.

11. The method according to claim 10, further comprising:
grouping the plurality of base station into groups in accordance with their load,
wherein, in allocating, the same communication channels are allocated to the base stations in a group of lower load base stations, based on a channel allocation result for the base stations in a group of higher load base stations.

12. The method according to claim 11, wherein, in allocating, each base station to which the same communication channel is allocated is selected based on a signal level of a wireless signal received, if the same communication channels are allocated to the base station in a group of lower load base stations.

13. The method according to claim 10, wherein, in allocating, the same communication channel is allocated based on an operation schedule of other communication apparatuses.

14. The method according to claim 10, wherein the load is determined based on at least one of communication traffic within a unit time, a number of connected terminals, a communication type, communication contents, and a QoS category.

15. The method according to claim 10, wherein the load is updated every predetermined time interval, and the channel allocation is periodically performed.

16. A control apparatus comprising:
a memory;
a processor;
an establishment unit configured to establish a predetermined communication channel for a plurality of base stations;
a verification unit configured to verify whether each base station of the plurality of the base stations receives a wireless signal from another base station of the plurality of the base stations via the predetermined communication channel;
a determination unit configured to determine a load for each of the plurality of base stations;
an order unit configured to order the plurality of base stations based on determined load; and
an allocation unit configured to allocate communication channels to the plurality of base stations in order of base station load from highest to lowest, based on the verified result,
wherein the allocation unit allocates a first communication channel to the highest load base station, a second communication channel to the second highest load base station if the second highest load base station is located in a position in which it can receive a wireless signal sent from the highest load base station, and the first communication channel to the third highest load base station if the third highest load base station is located in a position in which it cannot receive a wireless signal sent from the highest load base station,
wherein the establishment unit, the verification unit, the determination unit, the order unit, and the allocation unit are realized by the processor reading out and executing a program recorded in the memory.

17. The control apparatus according to claim 16, further comprising:
a grouping unit configured to group the plurality of base station into groups in accordance with their load,
wherein the allocation unit allocates the same communication channels to the base stations in a group of lower load base stations, based on a channel allocation result for the base stations in a group of higher load base stations.

18. The control apparatus according to claim 17, wherein the allocation unit selects each base station to which the same communication channel is allocated based on a signal level of a wireless signal received, if the allocation unit allocates same communication channels to the base station in a group of lower load base stations.

19. The method according to claim 16, wherein the allocation unit allocates the same communication channel based on an operation schedule of other communication apparatuses.

20. The method according to claim 16, wherein the load is determined based on at least one of communication traffic within a unit time, a number of connected terminals, a communication type, communication contents, and a QoS category.

21. The method according to claim 16, wherein the load is updated every predetermined time interval, and the channel allocation is periodically performed.

* * * * *